United States Patent [19]
Collins

[11] Patent Number: 5,749,463
[45] Date of Patent: May 12, 1998

[54] COMPACT DISC PAGKAGE WITH SPINES

[76] Inventor: William Collins, 30 Durham Rd., New Hyde Park, N.Y. 10040

[21] Appl. No.: 576,497

[22] Filed: Dec. 21, 1995

[51] Int. Cl.⁶ .................................................. B65D 85/57
[52] U.S. Cl. ........................... 206/308.1; 206/308.3; 206/313; 206/488
[58] Field of Search .................. 206/308.1, 308.3, 206/309–313, 488, 490

[56] References Cited

U.S. PATENT DOCUMENTS

| | | |
|---|---|---|
| 2,189,076 | 2/1940 | Liskin . |
| 2,827,223 | 3/1958 | Allison .................. 206/312 |
| 3,112,858 | 12/1963 | Ullger ................... 206/313 |
| 3,245,691 | 4/1966 | Gorman . |
| 3,595,383 | 7/1971 | Boylan . |
| 4,488,645 | 12/1984 | Yamaguchi . |
| 4,566,590 | 1/1986 | Manning et al. . |
| 4,653,639 | 3/1987 | Traynor ................. 206/308.3 |
| 4,805,770 | 2/1989 | Grobecker et al. . |
| 4,850,731 | 7/1989 | Youngs . |
| 5,048,681 | 9/1991 | Henkel . |
| 5,085,318 | 2/1992 | Leverick . |
| 5,101,973 | 4/1992 | Martinez . |
| 5,147,036 | 9/1992 | Jacobs . |
| 5,154,284 | 10/1992 | Starkey . |
| 5,188,229 | 2/1993 | Bernstein . |
| 5,207,717 | 5/1993 | Manning . |
| 5,248,032 | 9/1993 | Sheu et al. . |
| 5,255,785 | 10/1993 | Mackey . |
| 5,289,918 | 3/1994 | Dobias et al. . |
| 5,291,990 | 3/1994 | Sejzer . |
| 5,396,987 | 3/1995 | Temple et al. . |
| 5,460,265 | 10/1995 | Kiolbasa . |
| 5,506,740 | 4/1996 | Harmon . |

FOREIGN PATENT DOCUMENTS

| | | | |
|---|---|---|---|
| 5213387 | 8/1993 | Japan | 206/308.1 |
| 8702565 | 5/1989 | Netherlands . | |
| WO94/22742 | 10/1994 | WIPO | 206/309 |

*Primary Examiner*—Bryon P. Gehman
*Attorney, Agent, or Firm*—Frishauf, Holtz, Goodman, Langer & Chick

[57] ABSTRACT

A package suitable as a mailer for discs such as compact discs and computer floppy discs, has folded panels including a disc retention panel having a retaining tab thereon, and a pocket panel. The retention panel has raised sidewalls with edges facing each other and which are contoured to accommodate insertion of a disc therebetween. Tabs extend from an end of each of the sidewalls and toward the other of the sidewalls so as to define a space over the retention panel sufficient for accommodating a thickness of the disc and for retaining the disc in the package. The disc package has four spines at four respective side edges thereof to strengthen the disc package and to protect the disc retained in the disc package.

40 Claims, 9 Drawing Sheets

COMPACT DISC PACKAGE WITH SPINES

BACKGROUND OF THE INVENTION

1. Field of the Invention

The present invention relates to a package, such as a mailer, for holding one or more compact discs, computer floppy discs, or the like, securely for storage and transport without scratching or marring the playing surface of the disc, and for permitting rapid removal and full display of the entire face of the label side of the disc when the package is open.

2. Discussion of Related Art

Conventionally, packages for containing a compact disc or a computer floppy disc have been constructed entirely or partially of plastic or include paperboard sleeves and folders which hide all or a significant part of the label side of the disc from view. Some conventional packages have the potential of scratching or marring the playing surface of the compact disc. Other conventional packages require a considerable amount of hand operations for fabrication from paperboard and paper liners because they do not fold up flat before they are used.

Throughout the following description, a compact disc is generally referred to. However, it should be clear that the invention is equally applicable to other discs, such as computer floppy discs, or the like. The description with respect to "compact discs" should not be deemed to be limiting of the present invention. In the claims, the more generic claim "disc" is used to encompass not only compact discs, but computer floppy discs and the like.

U.S. Pat. No. 5,289,918 to Dobias et al. for example, recognized the need for a paperboard compact disc package to reveal decoration or information on the non-playing surface of the disc while the package is open. It further recognized the need to construct the package of recyclable materials rather than plastic and to automate the fabrication process to reduce manual labor.

As a proposed solution, U.S. Pat. No. 5,289,918 to Dobias et al teaches a folded container constructed from a single, unitary sheet that includes a disc holder panel having two sloped surfaces each with an elliptical diecut cutout. These elliptical diecut cutouts are shaped so that the larger of the two arcs of each ellipse is of a sufficient height and size to allow a disc to drop through easily at the top of the arc, which is at the top of the sloped surface, while the descending portion of the same arc decreases in size to snap in to lock the disc. The smaller of the two arcs of each ellipse is sufficient to support the disc at the edges without touching any other surface of the disc. As a result, the disc holder panel locks the disc at four points of its outer periphery.

It is desirable to form the compact disc folded package starting from a single, unitary sheet of paperboard that is initially flat and then folding it to a form to contain the compact disc and yet allow full view of the label side of the disc while the package is open, but without pinching the disc at four points of its outer periphery and yet taking precaution to prevent the disc from inadvertently popping out of its retention position.

It is an object of the present invention to provide a compact disc package which can be made of paperboard or the like on conventional folding equipment used in carton making and the like.

It is a further object of the invention to produce an economical compact disc package which can hold one or more compact discs for storage and/or mailing, while also protecting the compact disc.

A still further objection of the invention is to provide such a compact disc package which is easy to use and which is economical to manufacture.

SUMMARY OF THE INVENTION

One aspect of the invention resides in a compact disc package that has multiple panels folded with respect to each other while the package is in a closed condition. Preferably, the package includes a retention panel for holding the compact disc in position, a pocket panel for containing printed material pertaining to the recording on the compact disc, and a closure flap for keeping the package in the closed condition but which, when released, allows the package to open.

The retention panel includes sidewall panels, that are folded in an accordion-like manner except that one or more folded section nests between two others. Each sidewall is cut to define an elliptical contour except that the uppermost surface of the same end of each of the sidewalls preferably has a tab extending over the circular space defined by the contour of the sidewalls so as to be spaced from the retention panel by a distance sufficient to accommodate a thickness of the compact disc.

BRIEF DESCRIPTION OF THE DRAWING

For a better understanding of the present invention, reference is made to the following description and accompanying drawings, while the scope of the invention is set forth in the appended claims.

DESCRIPTION OF THE PREFERRED EMBODIMENT

Figure 1:
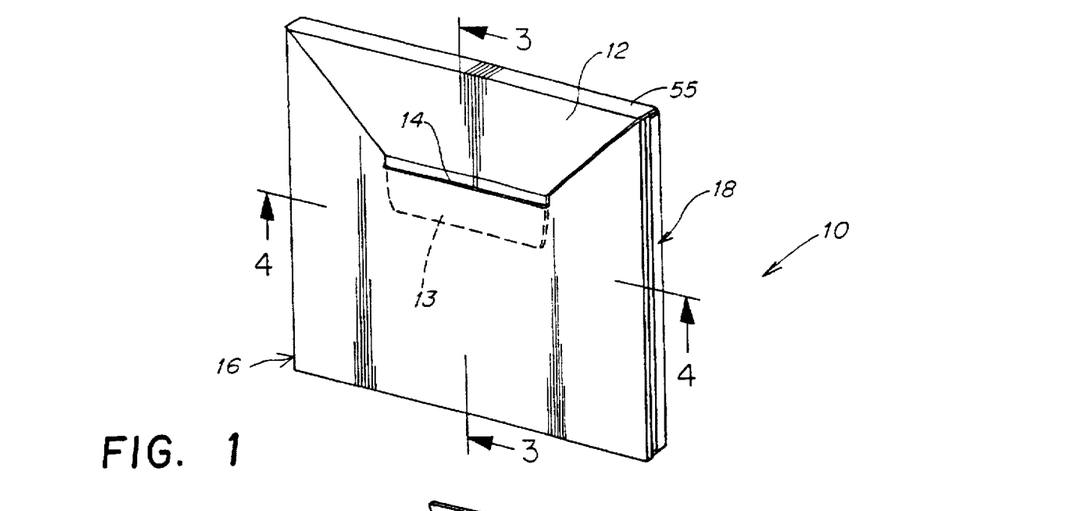
FIG. 1 is a perspective view of a compact disc package of the present invention shown in its folded, assembled, ready-to-transport condition.
Figure 2:
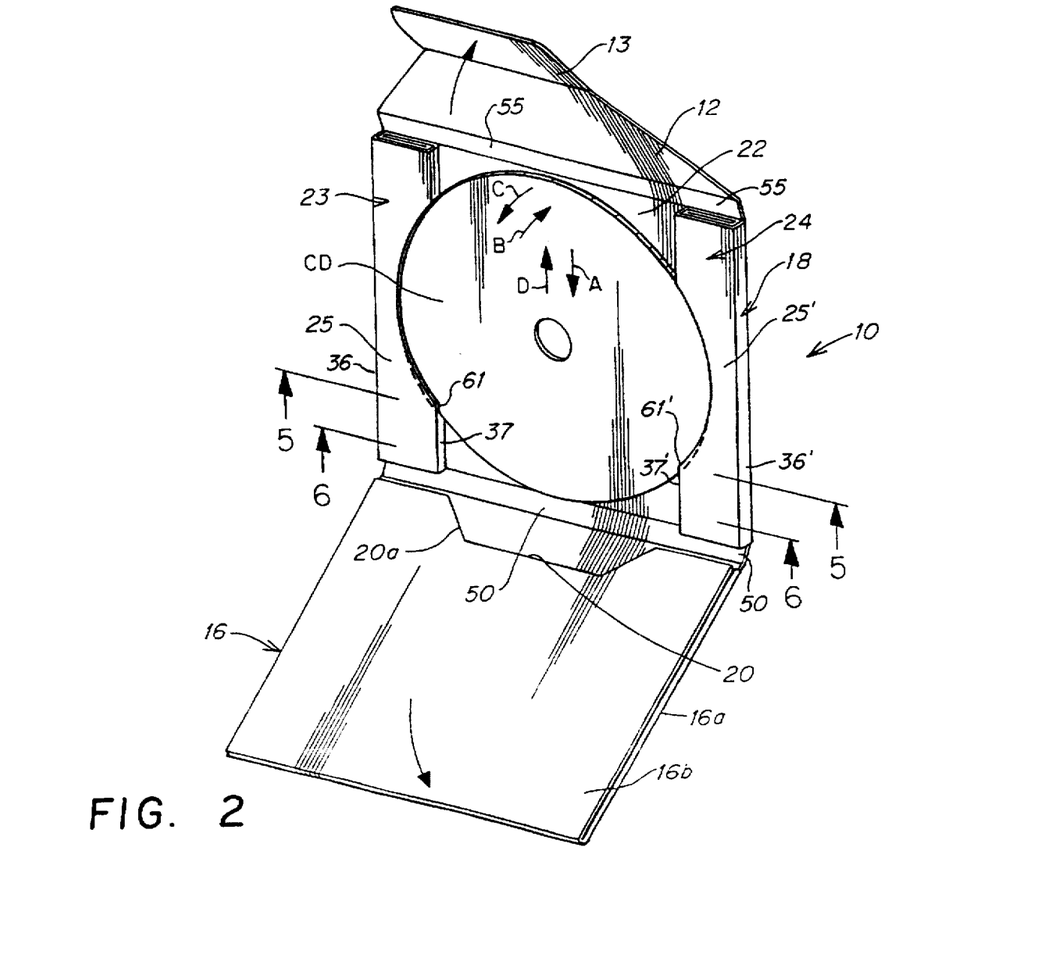
FIG. 2 shows a perspective view of the compact disc package of FIG. 1 in its open condition for insertion or removal of a compact disc.

FIGS. 1 and 2 show perspective views of a compact disc package 10. FIG. 1 shows the package 10 in a folded, closed condition, and FIG. 2 shows the package 10 in an open condition. The package 10 is preferably made of paperboard or other material than can be worked and formed on a conventional carton making machine. The package 10 includes a closure flap 12 whose free end 13 is insertable into a slit 14 formed in a front panel 16 (FIG. 1), and a retention panel 18 between the closure flap 12 and the panel 16. The panel 16 may be a pocket panel which includes two layers 16a, 16b forming a sleeve or pocket 20 therebetween, as seen in FIG. 2. The sleeve 20, as shown in FIG. 2, preferably has a recessed upper portion 20a to provide easy access for grasping the contents of the sleeve 20, which may hold promotional or other material concerning the compact disc.

Figure 8:
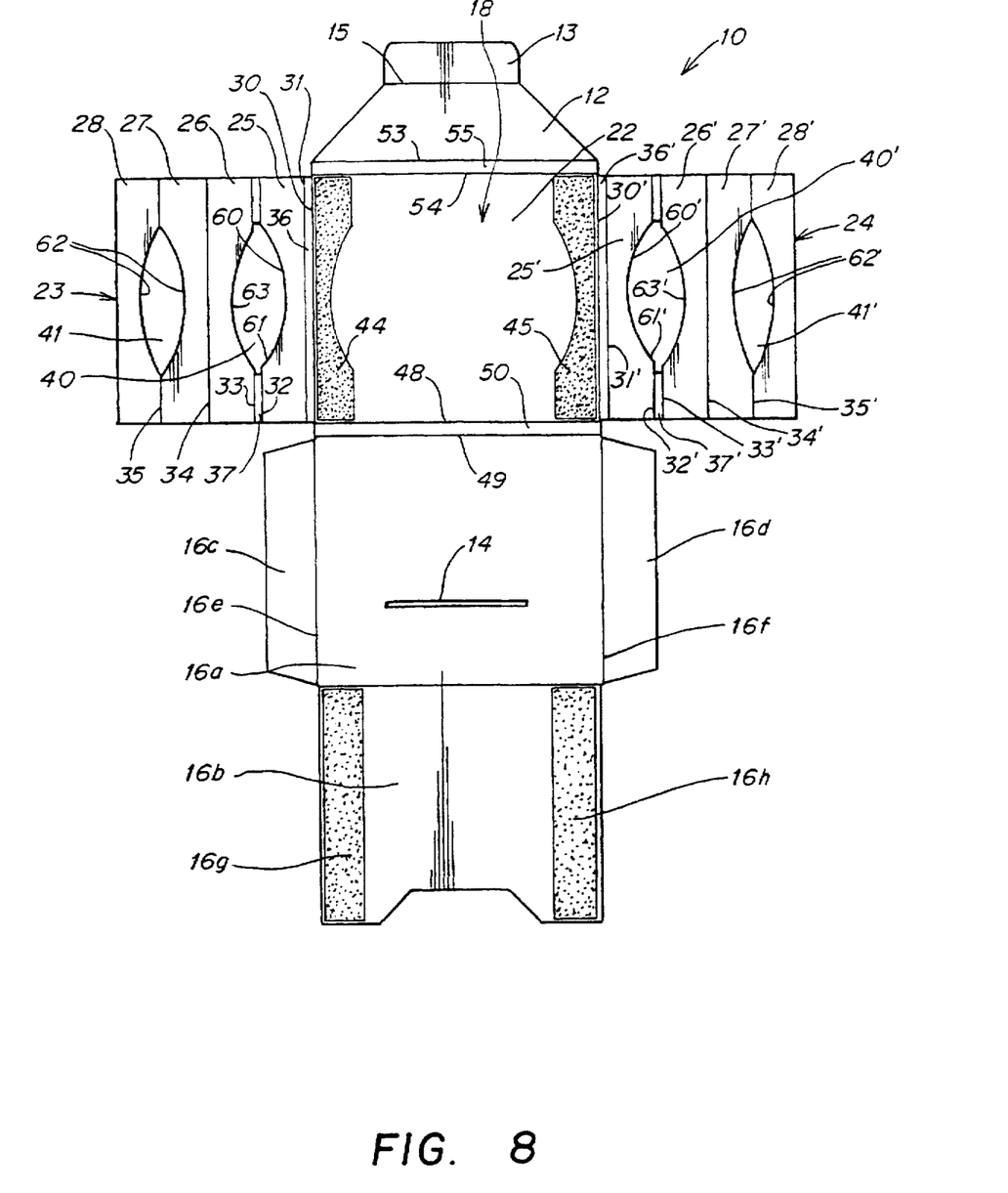
FIG. 8 is an unassembled plan view showing an unfolded blank from which the compact disc package of the invention may be constructed.

As shown in FIGS. 2–8, the retention panel 18 comprises a rear panel 22 having folded side sections 23, 24 at each side end thereof. The folded side sections 23, 24 each include a number of panel portion 25–28 having score or fold lines therebetween, as shown in FIG. 8. Extending to the left of the rear panel 22 of retention panel 18 is a folded side section 23 having a number of panel sections 25–28. The fold or score lines 30, 31 form a spine 36 therebetween when folded, which acts to make the resultant assembled configuration more rigid. The spine 36 also acts as a spacer so that additional layers of material can be located between panel 25 and rear panel 22. Similarly, fold lines 32, 33 are spaced a small distance apart to form a spine 37 therebetween. The panels are folded to form the structure shown in FIGS. 1 and 2, and as best seen in detail in FIG. 6. The right-side folded section 24 is similarly constructed, as shown in FIG. 8, wherein similar elements are shown by the same, but primed, reference numerals.

In the left-side folded section 23, cut-outs 40, 41 are formed between panels 25, 26 and between panels 27, 28, respectively. Similar cut-out portions 40', 40' are formed in the right-side folded section 24. The edges of the cut-out portions 40, 41, 40', 41' are contoured (curved) in such a manner as described hereinbelow for retaining a CD in the assembled package.

To the left and right of the front panel 16a are respective side flaps 16c, 16d, with fold or score lines 16e, 16f therebetween. The side flaps 16c, 16d and the panel 16b are optionally provided, as desired. When the side flaps 16c, 16d and panel 16b are omitted, the front panel of the package 10 comprises only panel 16a with a slit 14 therein for receiving the end member 13 of the flap 12. End portion 13 of the top flap 12 is connected to the main portion of flap 12 with a fold or score line 15 to facilitate opening and closing of the package.

When the disc package 10 is constructed as shown in FIG. 8, the flaps 16c, 16d are folded over onto panel 16a, and are secured to panel 16b by means of an adhesive (such as glue), for example shown by 16g, 16h, on the inside of panel 16b to form the pocket 20. The pocket 20 can be used for retaining printed matter or other materials either related or non-related to the compact disc.

The folded side sections 23, 24 as shown in FIGS. 1 and 2 are formed by folding, each in the manner shown in FIGS. 2 and 4–6, along the fold or score lines 30–35 of FIG. 8. In this manner, the panel sections 25–28 are folded on each other to form the folded sections 23, 24 as shown in detail in FIGS. 1, 2 and 4–6.

An adhesive 44, 45 is applied to the side edges of rear panel 22 that will contact the folded over panel 26, which is sufficient to keep the folded sections 25–28 in a folded condition where they are folded in the manner shown in FIGS. 1, 2 and 4–6. In lieu of an adhesive, other forms of fastening may be employed such as stapling or engagable hook and loop material. Adhesive, however, is preferred.

Score lines 48, 49 are provided between the rear panel 22 and the pocket panel 16 along their commonly connected side. The score lines 48, 49 are spaced apart to provide a spine 50 therebetween which acts as a spacer and a stiffening member to make the package more rigid and to prevent damage to the CD. Score lines 53, 54 are provided between the rear panel 18 and the closure flap 12 along their commonly connected side to form a spine 55 therebetween. Spine 55 functions similarly to spine 50.

The score lines 48, 49 are spaced from each other sufficient to permit the pocket panel 16 to be folded against the folded sections 23, 24 on the rear panel 22. The score lines 53, 54 are similarly spaced from each other sufficient to permit the closure flap 12 to be folded so that its end 13 may be inserted into the slit 14 as shown in FIG. 1, which shows the compact disc package 10 in the closed condition.

The oval openings 40, 41, 40', 41' in the folded side sections 23, 24 are cut to define generally elliptical contours that generally mirror each other. The radius of curvature of contours 60 generally conform to that of the outer periphery of the compact disc, except in the regions 61, 61' (henceforth referred to as tabs) of the sections 25, 25' (see FIG. 8) that are outermost in the folded (assembled) condition (see FIGS. 5 and 6) and where the radius of curvature is smaller so that the tabs 61, 61' extend inwardly (over the compact disc—FIG. 5) beyond the contour of the other panel sections 26–28 and are spaced from the rear panel 22 in a direction perpendicular to the rear panel 22 (see FIGS. 4–6).

In effect, the side sections 23, 24 project out of the plane that defines the upper or inner surface of the rear panel 22 and the spacing underneath the inwardly extending tabs 60, 60' is sufficient to accommodate the thickness of the compact disc.

Figures 3, 4, 5, 6, 7:
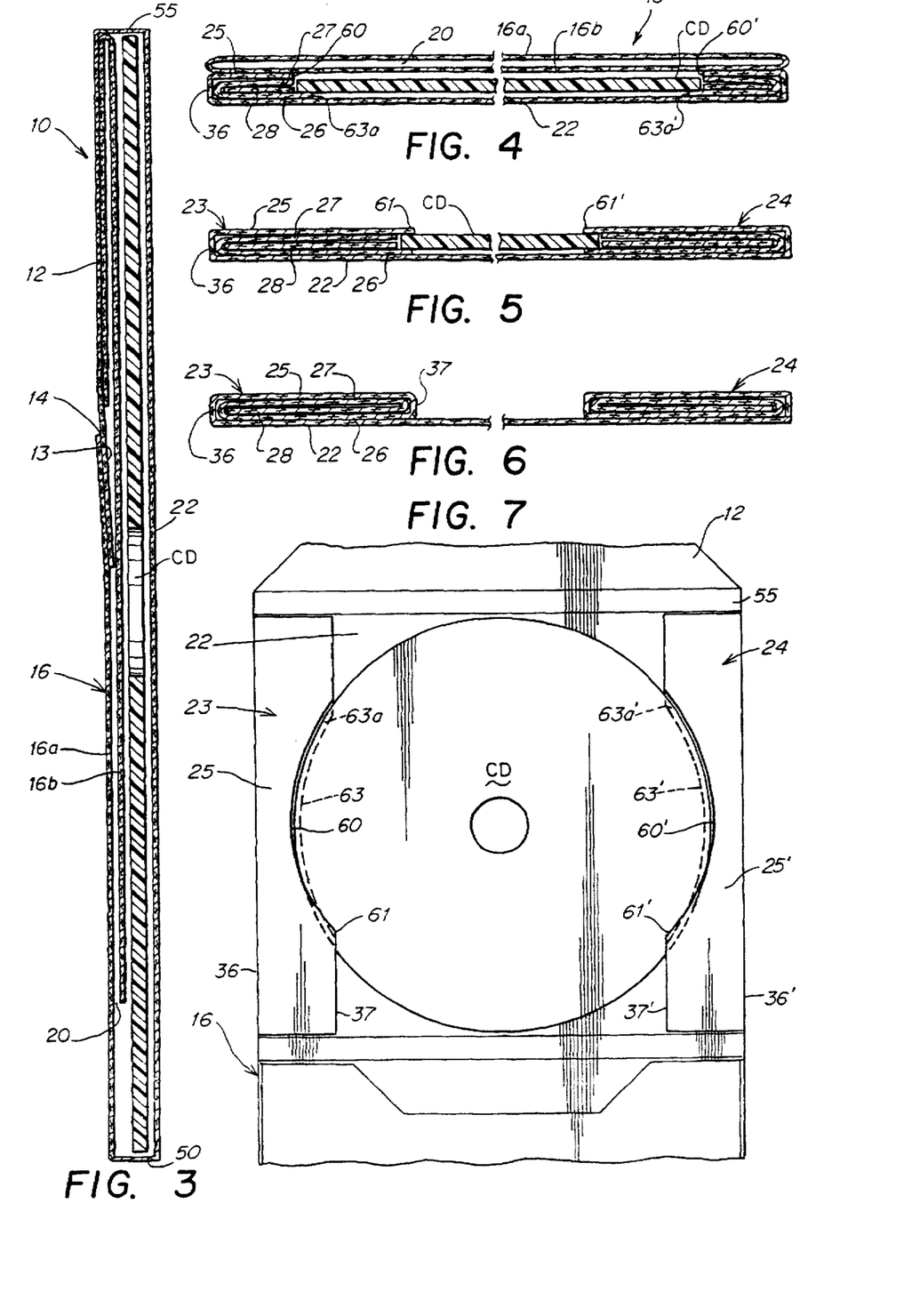
FIG. 3 is a sectional view taken along line 3—3 in FIG. 1, with a compact disc mounted therein.
FIG. 4 is a sectional view taken along line 4—4 in FIG. 1, with a compact disc mounted therein.
FIG. 5 is a sectional view taken along line 5—5 in FIG. 2, with a compact disc mounted therein.
FIG. 6 is a sectional view taken along line 6—6 in FIG. 2, with a compact disc removed from the package.
FIG. 7 is an enlarged front view of the compact disc package of FIG. 2, showing the mounting surfaces for the compact disc in detail.

The oval or elliptical openings 41, 41' have generally elliptical contours 62, (62') which are contoured such that the contour 62 does not extend beyond behind the contour 60, and does not extend beyond the contour 63. The contour 63 has a larger radius of curvature so that the edge portion of the contour 63 extends inwardly and under the CD which is placed in the package (see FIG. 4). The inwardly extending portion 63a of contour 63 is shown in dashed lines in FIG. 7. The projecting or inwardly extending portions 63a, 63a' of panels 26, 26' on opposite sides of the package serve as spacers behind the CD to space the rear surface of the CD off of the inner surface of rear panel 22, thereby further protecting the CD from damage. Thus, when the CD is mounted in the package, as shown in detail in FIG. 7, the outermost panels 25, 25' having the tabs 61, 61' respectively serve as retention members and also as spacer members to space the top surface of the CD from the inner surface of the front cover member 16 when the compact disc package 10 is in its closed condition as shown in FIG. 1. The projecting or inwardly extending portions 63a of panel 26 (and the projecting portions 63a' of panel 26') serve as rear spacers for spacing the rear surface of the CD from the top or front facing surface of rear panel 22. In this manner, the CD is securely held in position and the front and rear flat surfaces of the CD are prevented from being damaged by contact with surface portions of the CD package 10. The contours 62 of panels 27, 28 are spaced away from the edge of the CD so as to "clear" the CD when the CD is mounted in position, as seen in FIG. 4. Similarly, the portion of the contour 60 (60') which does not have the tab 61 (61') thereon is cut so as to clear the CD when the CD is mounted as shown in FIG. 4. Preferably, the contours 62 have curvatures that generally follow the curvature of the circular peripheral edge of the CD so as to be spaced from the circular peripheral edge of the CD and to provide structural integrity to the overall CD package and to keep panels 25 and 26 positively spaced from each other by a distance at least equal to the thickness of the CD or greater. All of the cut-outs defining cut-out portions 40, 41 are preferably die-cut, in a conventional manner. The various fold lines are also formed in a conventional manner, for example using a conventional machine for forming such fold lines, for example as in a carton-making apparatus.

Referring to FIG. 2, the compact disc CD is inserted into position in the package 10 by moving it in the direction of arrow A so that two lower locations along the peripheral edge of the compact disc CD fit into position beneath the tabs 61, 61'. See also the cross sections of FIG. 5 which also illustrate this position.

After reaching this position beneath the tabs, the remainder of the disc drops into place and the CD is pushed in the direction of arrow B in FIG. 2 so as to become seated in position. The pocket panel 16 may then be swung about its score lines so that the face of its sleeve 20 faces the label side of the compact disc CD. The closure flap 12 may then be folded along its score lines to close the compact disc package 10 in the manner shown in FIG. 1.

The manner of closing the closure flap 12, i.e., through insertion into slit 14, may be replaced by other conventional fastening techniques, such as with engaging hook and loop material.

Referring again to FIG. 2, the compact disc CD is removed from the package 10 by pulling the upper edge outwardly in the direction of arrow C so as to clear the inner sidewall portions 25, 25' of the folded side sections 23, 24. Then, the CD is lifted upwardly in the direction of the arrow D so as to release it from the tabs 61, 61', thereby enabling the CD to be easily removed from the package 10.

Figure 9:
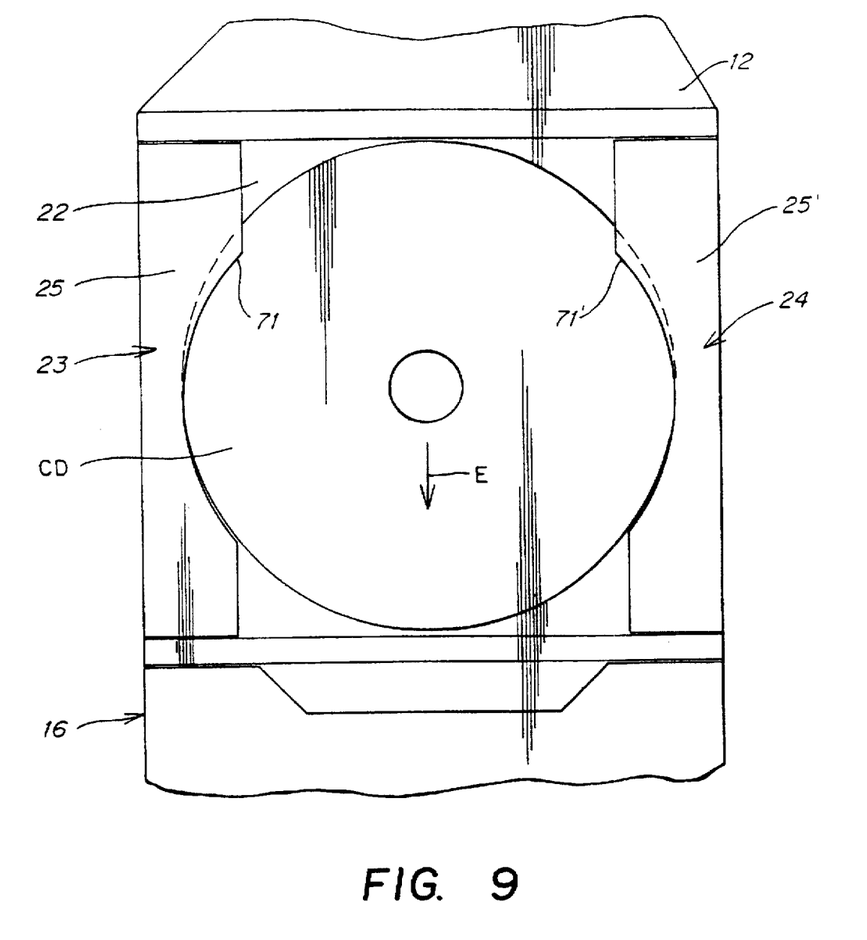
FIG. 9 is a front view of the compact disc mounting portion of a first alternate embodiment of the present invention.

FIG. 9 shows a modified arrangement which is the same as the embodiment of FIGS. 1-8, except that the tabs 61, 61' are replaced by similar tabs 71, 71' which are located in the upper portions of the panels 25, 25' of the folded side sections 23, 24, respectively. In all other respects, the embodiment of FIG. 9 is identical to the embodiment of FIGS. 1-8. To remove the CD from the package of FIG. 9, the CD is moved downwardly in the direction of arrow E instead of upwardly in the direction of arrow D shown in FIG. 2. The rear spacing portions 63a, 63a' shown in FIG. 7 are also provided in the embodiment of FIG. 9.

Figure 10:
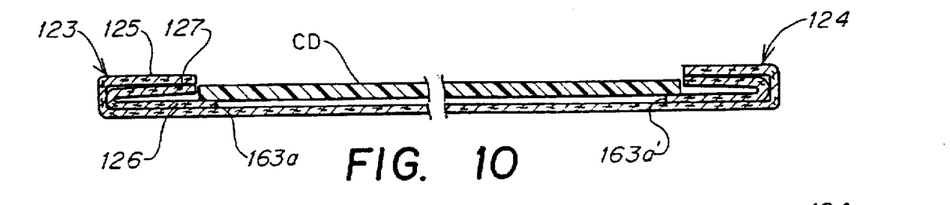
FIG. 10 is a sectional view similar to FIG. 4 of a second embodiment of the present invention.
Figure 11:
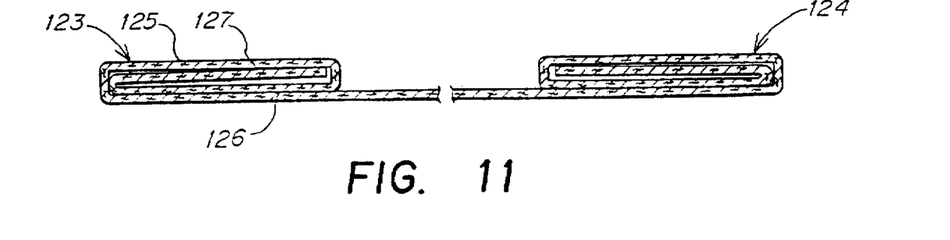
FIG. 11 is a sectional view, similar to FIG. 6, of said second embodiment of the invention.

FIGS. 10 and 11 show sectional views similar to FIGS. 4 and 6, respectively, of a second embodiment of the invention. The sectional views shown in FIGS. 4 and 6 (and 10 and 11) are of the rear panel 22 and the folded side sections 23, 24. The main difference between FIGS. 10 and 11 and the embodiment of FIGS. 1-9 is that in FIGS. 10 and 11, the endmost panel portion 28, 28' is omitted. The spacer portion 163a is provided similar to spacer portion 63a in the embodiment of FIGS. 1-8. The tab portions 61, 61' of FIGS. 1-8 are also provided in the embodiment of FIGS. 10 and 11, but are not shown in FIGS. 10 and 11.

Figure 12:
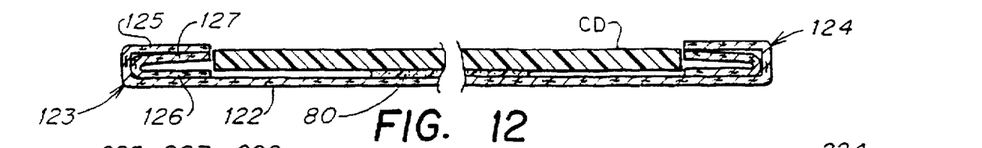
FIG. 12 is a sectional view, similar to FIG. 4, of a third embodiment of the invention.

FIG. 12 shows another embodiment of the invention which is similar to the embodiment of FIGS. 10 and 11, but wherein the spacer element 163a (which is a projection of panel 126) is replaced by a center spacer member 80, which is secured to the rear panel 122, for example by an adhesive. In all other respects, the embodiment of FIG. 12 is similar to that of FIGS. 10 and 11, and the remaining portions not shown in FIG. 12 are the same as shown in FIGS. 1-8. The spacer member 80 is preferably a soft material such as, for example, soft plastic, paper, foamed plastic or foamed rubber, cardboard, felt or other fabric, or the like.

Figure 13:
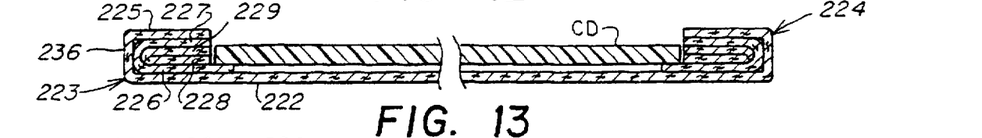
FIG. 13 is a sectional view, similar to FIG. 4, of a fourth embodiment of the invention.
Figure 14:
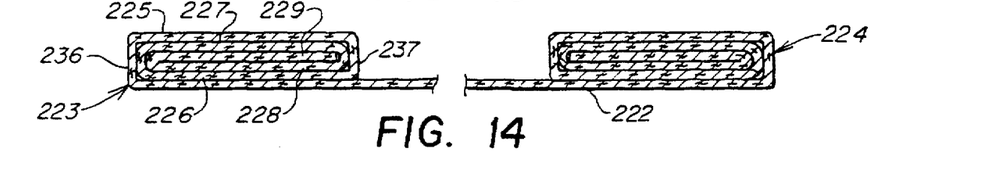
FIG. 14 is a sectional view, similar to FIG. 6, of said fourth embodiment of the invention.
Figure 15:
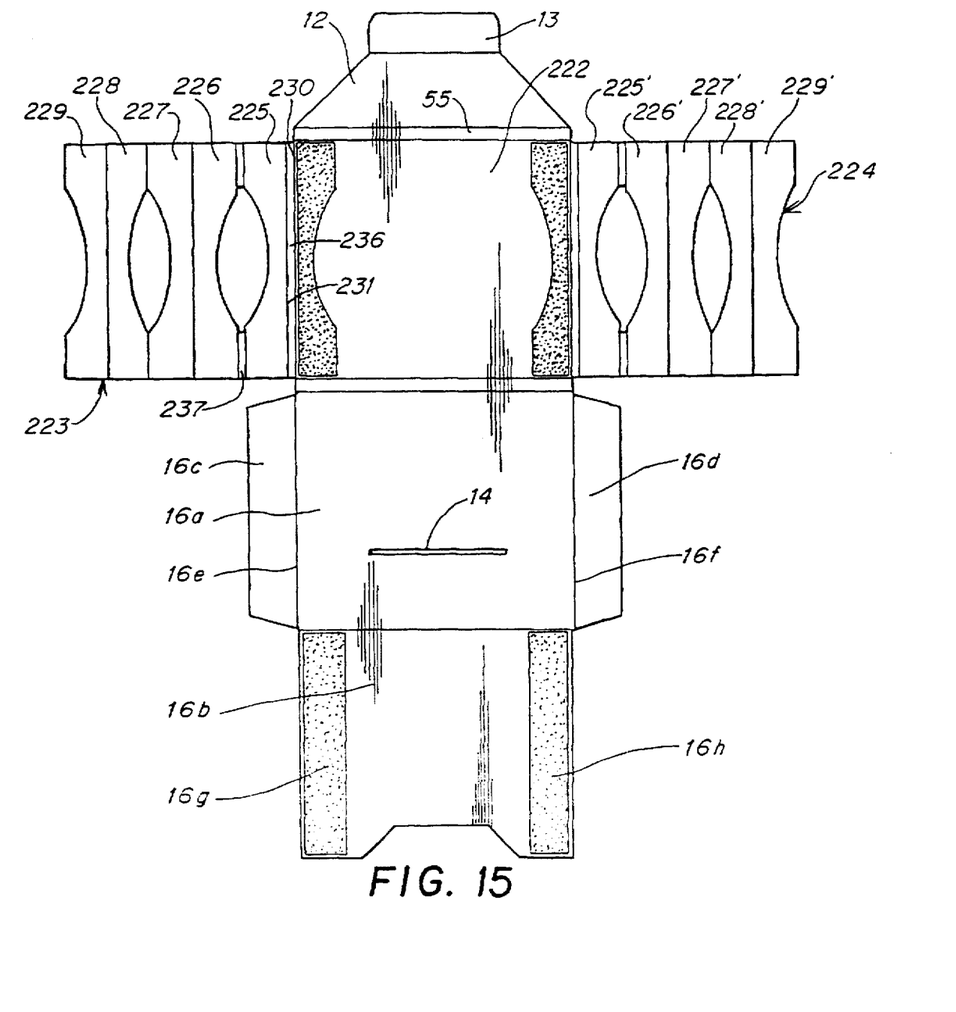
FIG. 15 is an unassembled plan view showing an unfolded blank from which the compact disc package of the fourth embodiment of FIGS. 13 and 14 is made.

FIGS. 13, 14 and 15 illustrate still another embodiment of the invention which is similar to that of FIGS. 1-8, except that an additional panel 239 (see FIG. 15) is included in the folded side sections 223, 224. In FIGS. 13-15, elements which are the same as in FIGS. 1-8 are given the same reference numerals, and elements which are similar to those shown in FIGS. 1-8 are given the same reference numerals incremented by 200. In FIGS. 13-15, the folded end sections 223, 224 respectively include an additional panel 229, 229' which act as an additional spacer member at the middle of the folded side sections 223, 224 so as to provide more space for retaining the CD. This arrangement is suitable for use with CD's having thicker dimensions and/or where it is desired to provide additional space for retention of the CD therein and/or where thinner materials are used (since one added layer is provided, sufficient space for the CD is still provided). As shown in FIGS. 13 and 14, three layers of material are arranged (folded) between the outermost layers 225, 225' (having the tabs 61, 61' thereon) and the bottommost layers 226, 226'. Operation of the embodiment of FIGS. 13-15, after being folded to the condition to form a package, is the same as described above with respect to FIGS. 1-8.

Figure 16:
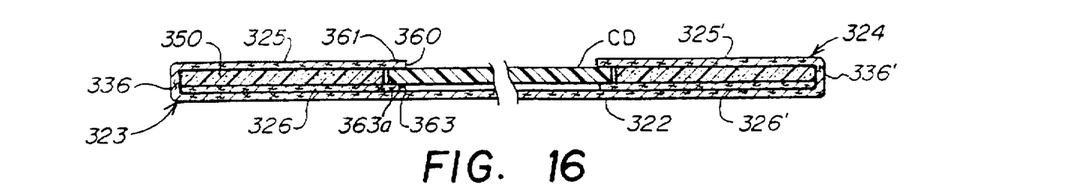
FIG. 16 is a sectional view, similar to FIG. 6, of a fifth embodiment of the present invention.
Figure 17:
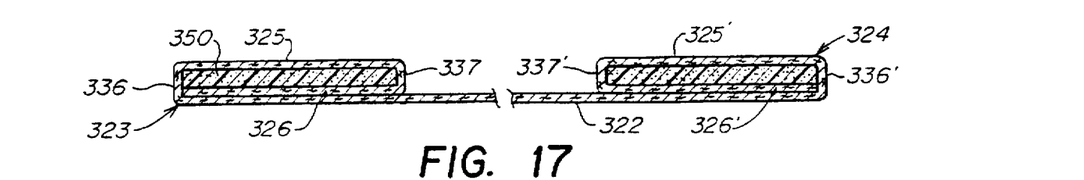
FIG. 17 is a sectional view, similar to FIG. 6, of a sixth embodiment of the present invention.

FIGS. 16 and 17 show still another embodiment of the invention wherein the folded side sections 323, 324 comprise only two panels 325, 326 (325', 326') interconnected by spine 337, 337' the panel sections 325, 325' being interconnected with rear panel 322 via respective spines 336, 336'. The contours 360, 363 of the oval cut-out 40 (not shown) between panels 325, 326 are preferably the same as the corresponding contours shown in FIG. 8. That is, the contour 63 defines a spacing portion 363a which extends under the CD, and the contour 360 defines a clearance with a tab 361 extending over the top of the CD. Instead of having a plurality of additional folded panel sections 27, 28 of FIG. 8, the spacer is provided by a plastic strip 350 (preferably shaped like panel 27 of FIG. 8) which is inserted between panel sections 325, 326. The insert 350 has an inner-facing surface contour similar to contour 62 of FIG. 8 so as to provide a clearance around the circular peripheral edge of the CD mounted in the package. The spacer 350 has a thickness which is at least equal to the thickness of the CD so as to space the upper tab 361 from the lower or rear spacing portions 363a, to permit the CD to be inserted therebetween. The spacer 350 is preferably made of an elastomeric material, such as a plastic material which is easily molded, and is preferably glued in position between panels 325, 326. Spacer 350 could also be retained by friction between panels 325 and 326.

As should be clear, the construction of the right side folded member 324 is identical to the above-described left side folded member 323.

Figure 18:
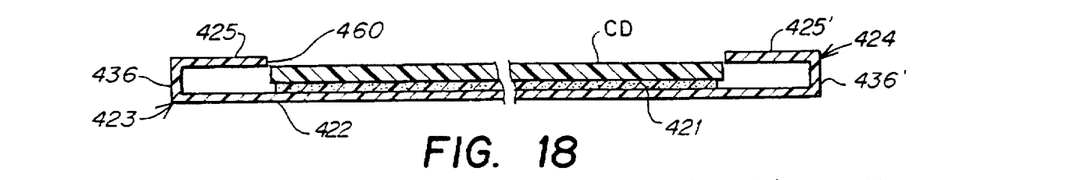
FIG. 18 is a sectional view, similar to FIG. 4, of a seventh embodiment of the present invention.
Figure 19:
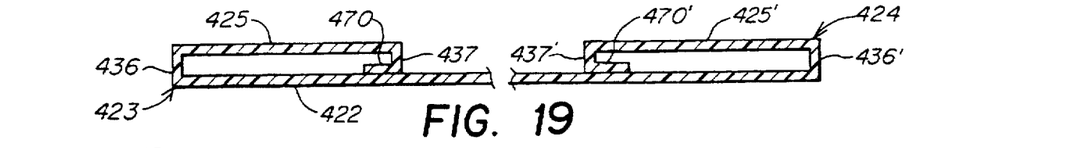
FIG. 19 is a sectional view, similar to FIG. 6, of the embodiment of FIG. 18.
Figure 20:
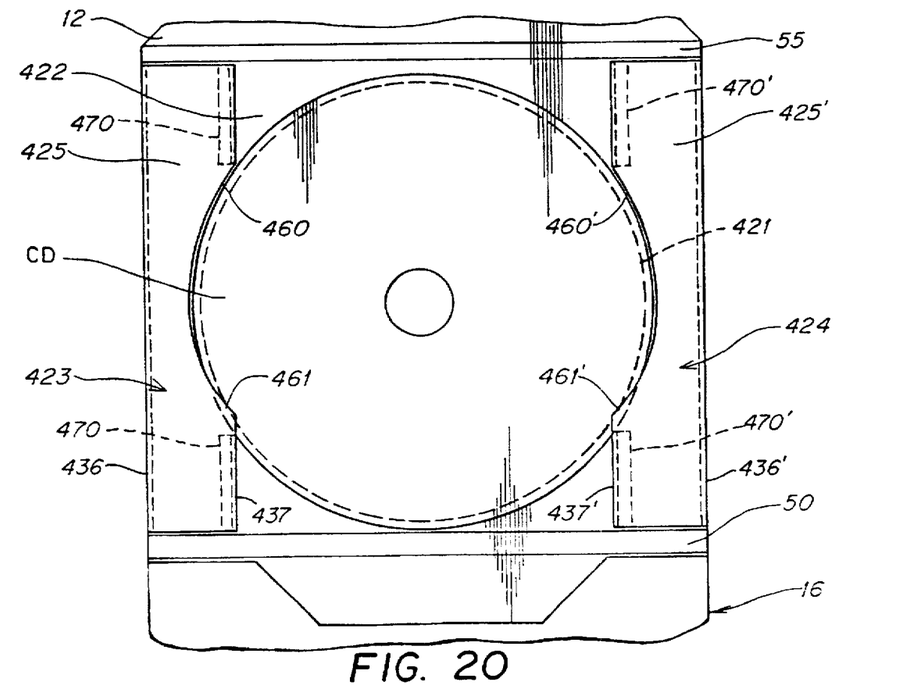
FIG. 20 is a front view of the disc holding portion of the embodiment of FIGS. 18 and 19 with a compact disc mounted therein.

FIGS. 18–20 illustrate another alternate embodiment of the invention wherein the side folded portions 423, 424 have only panels 425 (similar to panels 25 of FIG. 8) having a surface contour 460 with a tab 461 for retaining the CD. The rear panel 422 has a spacer member 421 adhered thereto to space the CD from the inner surface of rear panel 422 and to serve as a cushion member. FIG. 18 is a section taken on a line similar to FIG. 4.

FIG. 19 shows the embodiment of FIG. 18, taken along line 6—6 of FIG. 2, showing how the upper panel 425 is maintained spaced from the rear panel 422. More particularly, in the portions designated by fold lines 32, 33 in FIG. 8, a spine member 437 is provided above and below the opening 40, and a tab portion 470 is connected to the spine portion 470 and is adhered to the inner surface of the rear panel 422 as shown in FIG. 19.

FIG. 20 shows the embodiment of FIGS. 18 and 19 with a CD mounted therein.

Figure 21:
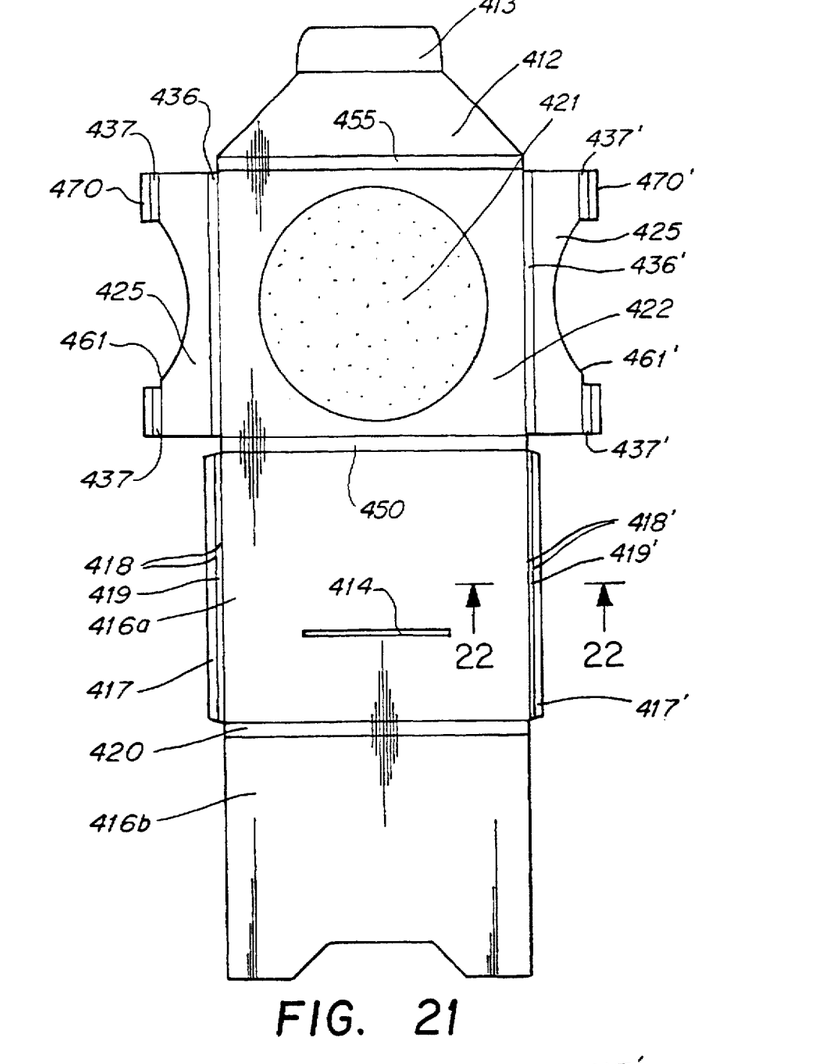
FIG. 21 is an unassembled plan view showing an unfolded blank from which the compact disc package of FIGS. 18–20 is made.

FIG. 21 shows an unfolded blank from which the package of FIGS. 18–20 is fabricated. As seen in FIGS. 18 and 19 (sectional views), the material from which the blank of FIG. 21 is made of is a plastic material, such as polyethylene or other suitable thin, foldable plastic material. Preferably, the plastic material is relatively thin so as to be die-cuttable and foldable along fold lines or V-shaped fold grooves, and is sufficiently stiff as to provide sufficient structural integrity when the folded package is assembled. The various spines 436, 437, 50, add structural rigidity to the overall device when it is folded into the assembled condition, in a manner similar to the corresponding spines shown in FIGS. 1 and 2. When assembled, the panel sections 470 are preferably adhered to the inner surface of rear panel 422 using an adhesive, a solvent, or by ultrasonic welding, or the like.

Figure 22:
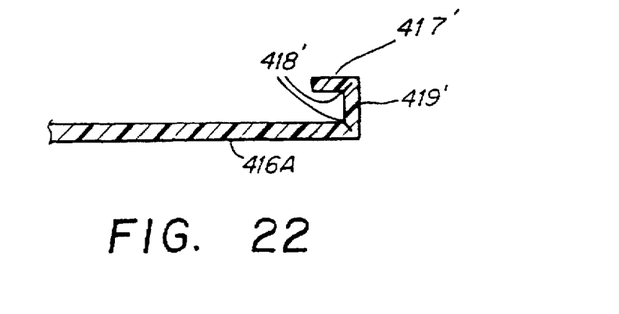
FIG. 22 is a detail showing a sectional view taken along line 22—22 in FIG. 22, but with one edge folded up.

The pocket portion in FIG. 20 is fabricated by having a short up-standing wall 417 (bent upwardly as shown in FIG. 22 along fold groove 418), and the front panel 416b is preferably folded upwardly around spine 420 (along respective fold grooves) so that the inner surfaces of the up-standing members 417 can be adhered to the side edges of panel 416b. Adherence can be by means of adhesive, a solvent, ultrasonic welding or other suitable connection means. In operation, the embodiment of FIGS. 18–22 operates the same way as the previously described embodiment of FIGS. 1–8.

The rear spacer member 421 is preferably made of a soft cushion member such as elastomeric (foamed plastic or foamed rubber) material, felt or other suitable materials. It is preferably adhered to the rear panel 422 by means of an adhesive.

The up-standing wall portion 437 shown in FIG. 19 provides the appropriate spacing and stiffness to retain the CD in place securely between the outer tab 461 and the rear cushion member 422.

Figure 23:
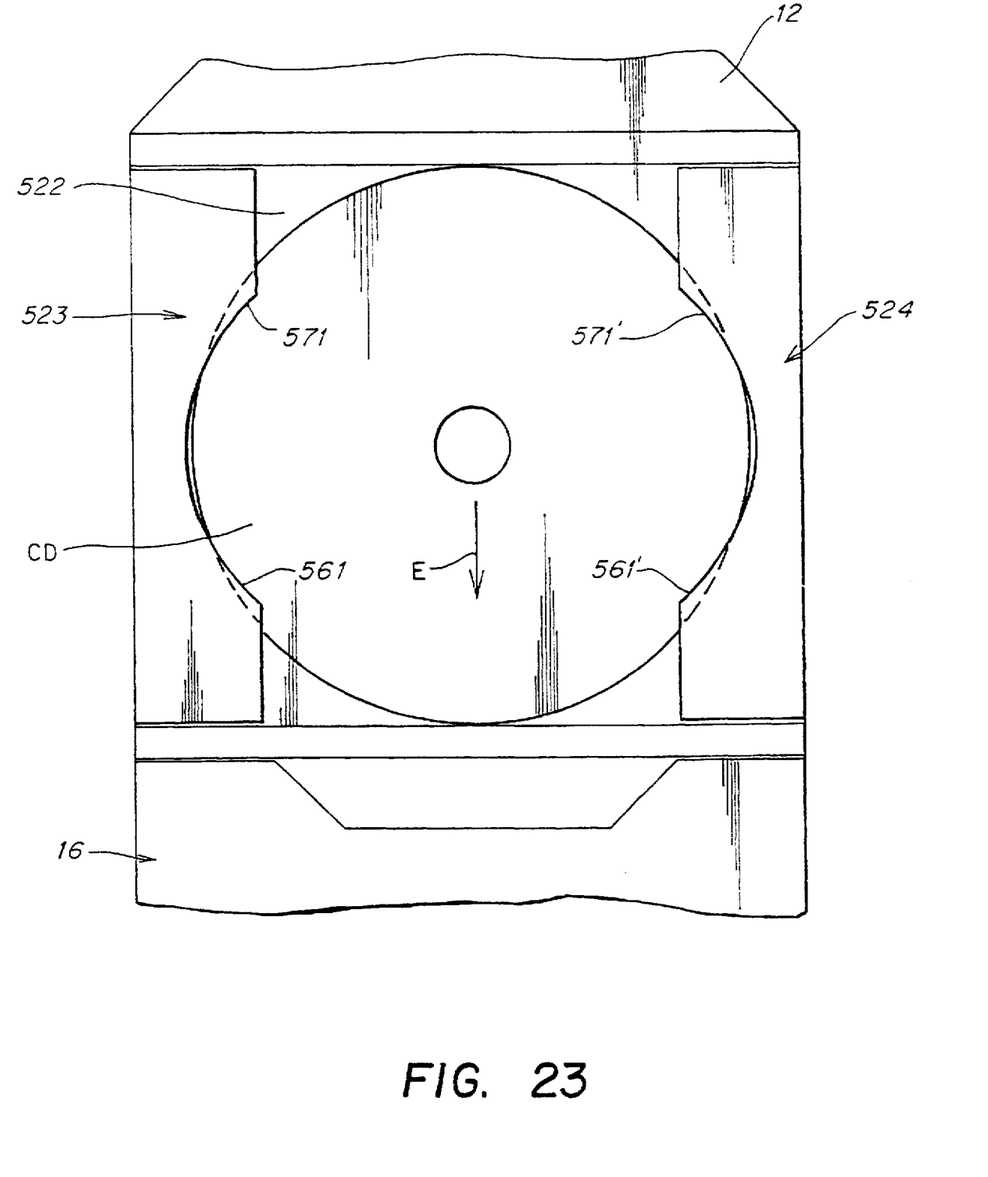
FIG. 23 is a front view of still another embodiment of the invention.

FIG. 23 illustrates another embodiment of the invention having tabs 561, 571, 561', 571' at the upper and lower portions of the side sections 523, 524. The sections 523, 524 can take the form of any of the sections 23, 24 discussed hereinabove, but instead of only having tabs at either the lower portion of the side sections (FIGS. 1–8) or the upper portion of the side sections (FIG. 9), the embodiment shown in FIG. 23 has two sets of tabs. This arrangement more securely retains the disc CD in position. In operation, the disc is slid either downwardly under tabs 561, 561' and pressed against tabs 571, 571' to "snap over" and under the tabs 571, 571', or the disc can be inserted upwardly in a direction opposite to the direction of arrow E so as to slide under the upper tabs 571, 571', and the lower portion of the disc can be pushed inwardly to snap over and under the lower tabs 561, 561'. In this embodiment, the secondary tabs over which the CD is snapped after insertion under primary tabs can be of smaller inward extension so as to facilitate snapping the CD over and under the projecting tabs.

In all of the above-described embodiments, the circular portions of the side sections 23, 24 (and their equivalents) is closely contoured so as to follow the contour of the CD so that when the CD is inserted, it is securely retained in position without inadvertently falling out of the package. For example, in the embodiment of FIGS. 1 and 2, the upper portion of the circular contour of the side sections 23, 24 is preferably contoured so as to contact the side circular peripheral edge of the CD when inserted, so as to frictionally retain the upper portion of the CD in the package. Similarly, the lower portions in the embodiment of FIG. 9 are contoured so as to contact the circular peripheral portions of the CD to retain it in position, preferably by light friction.

As should be clear from the above, the shape of the cut-out portions of the side sections 23, 24 is configured so as to generally follow the shape of the article being held in the package. For example, if an oval disc is used, the shape of the opening defined by the facing portions of the side sections 23, 24 will be suitably configured in a generally oval shape. If a computer floppy disc of generally rectangular shape is to be retained or held in the package, then the contour of the facing portions of the side sections 23, 24 will be generally rectangular, as described below with respect to FIGS. 24 and 25.

Figures 24, 24A, 25:
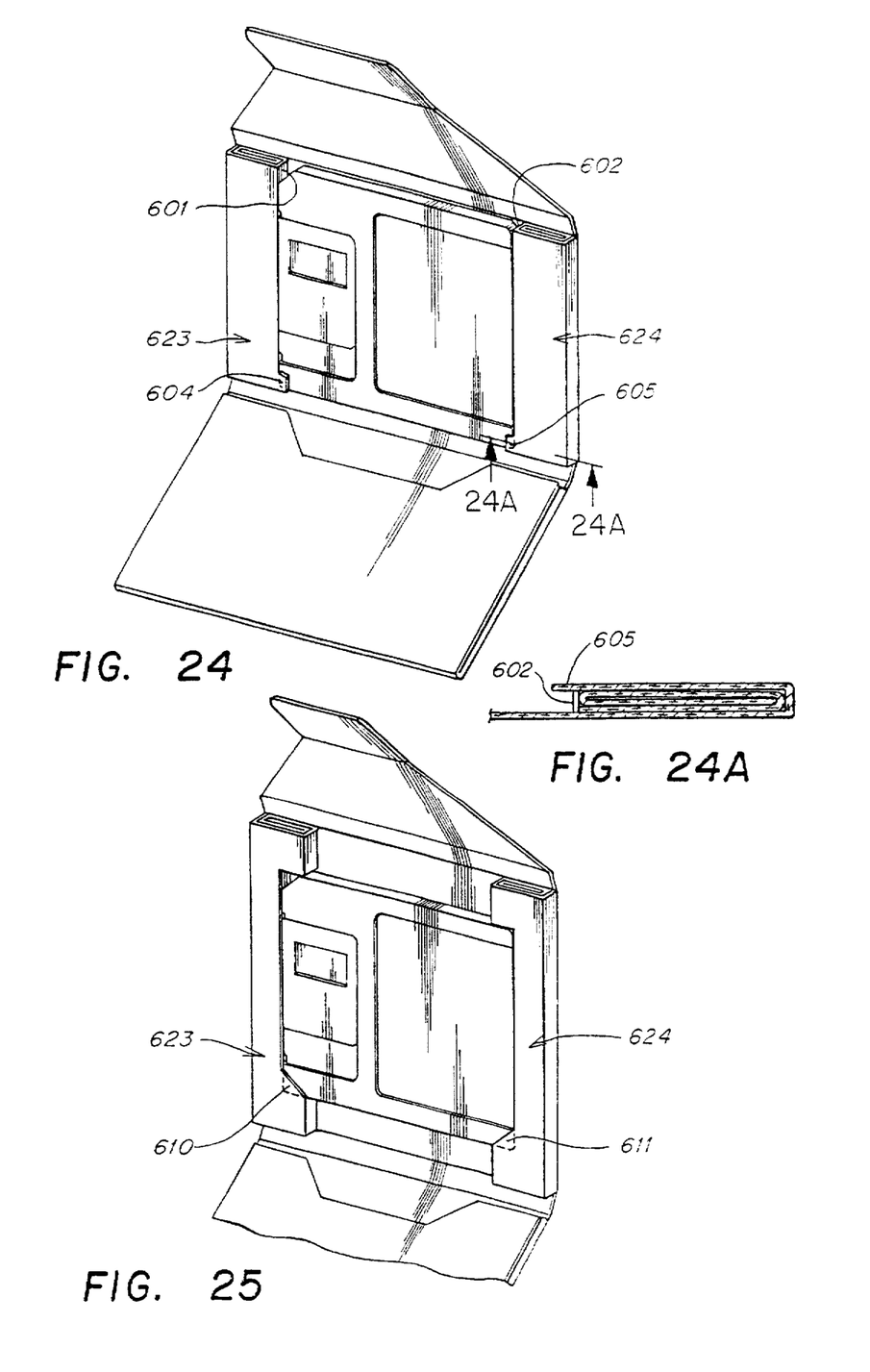
FIG. 24 is a perspective view of a package of the present invention configured to hold a computer floppy disc.
FIG. 24A is a partial sectional view taken along line 24A—24A in FIG. 24.
FIG. 25 is a partial perspective view of another configuration of the package of the present invention for holding a computer floppy disc therein.

FIG. 24 shows a disc package configured to hold a computer floppy disc. The disc package of FIG. 24 is formed generally similarly to the disc package described above with respect to FIGS. 1–8, except that a generally straight spine 601, 602 is formed by the folded side sections 623, 624, and a cut-out tab portion 604, 605 is formed at the lower portion of the folded side section 623, 624, as shown in FIGS. 24 and 24A.

In the embodiment of FIG. 24, the spines 601, 602 are substantially continuous and the folded side sections 623, 624 do not have cut-out portions at the intermediate parts thereof, except where the tabs 604, 605 are formed.

FIG. 25 shows another embodiment for holding a computer floppy disc. In the embodiment of FIG. 5, which generally corresponds to the embodiment of FIGS. 1–8, rectangular cut-out portions are formed in the panels of the folded side sections which correspond to panels 25, 26, 27 and 28 of FIG. 8. In the embodiment of FIG. 25, instead of the cut-out portions being generally curved, they are part rectangular in shape, as clearly seen in FIG. 25.

FIG. 25 shows a tab portion 610, 611 at the lower part of the side sections 623, 624 which serves to more positively retain a computer floppy disc in place, when inserted into the package. The tab portions 610, 611 are located similarly to portions 61, 61' in FIG. 8, but are differently shaped, as clearly seen in FIG. 25.

All of the embodiments of the present invention have a main feature in common. That is, all of the embodiments of the present invention have four spines created at the respective four peripheral edge portions of the package, which spines provide the package with a high degree of structural integrity. For example, referring to FIG. 8, the four spines are spines 36, 36', 50 and 55. Similar spines are provided in the other embodiments and also in FIGS. 24 and 25. As clear from the above description, the height of the respective spines can be varied to desired measurements, by varying the material gauge and/or the number of folded panels (for example, panels 25, 25, 27, 28 of FIG. 8). The cut shape of the panels will determine which application unit the package will hold (compact disc, computer floppy disc, and the like).

While the invention has been described above with respect to specific embodiments, it should be clear that various modifications and alterations can be made, and that various features from each embodiment can be combined with the other embodiments in any combination consistent with the respective showings in the other embodiments, to provide further alternate embodiments, within the scope of the invention as set forth in the appended claims.

What is claimed is:

1. A disc package, comprising:
   a retention panel defining a plane;
   first and second folded sidewall sections extending out of said plane from said retention panel, said first and second folded sidewall sections having edges facing each other and the facing edges being contoured to substantially correspond to a periphery of a disc for accommodating insertion of the disc between the facing edges; and
   tabs extending from at least a portion of at least one of said first and second folded sidewall sections toward the other of said folded sidewall sections, and being spaced from said plane by a distance sufficient for accommodating a thickness of the disc between said plane and said tabs, said tabs extending over a surface portion of the inserted disc to contact the disc at spaced apart peripheral portions to retain the disc therein;
   wherein each of said first and second folded sidewall sections includes at least first and second substantially adjacent panels, the first panel being interposed between the retention panel and the second panel, each of the first and second panels defining at least a portion of a facing edge, which portion has a radius of curvature which substantially conforms to a radius of curvature of the disc.

2. A disc package as in claim 1, further comprising a pocket panel sharing a common side with said retention panel, said pocket panel having a sleeve that defines a pocket into which material may be removably contained, said common side having a score line for folding said sleeve about said score line and into contact with said folded sidewall sections.

3. A disc package as in claim 2, wherein said folded sidewall sections each have first and second ends, the first end being closer to said common side than that of the second end, said tabs extending only from the first end of said sidewall section.

4. A disc package as in claim 2, wherein said folded sidewall sections each have first and second ends, the first end being closer to said common side than that of the second end, said tabs extending only from the second end of said sidewall sections.

5. A disc package as in claim 2, wherein said folded sidewall sections each have two ends, a first of said two ends being closer to said common side than that of a second of said two ends, said tabs extending from both the first and second of said sidewall sections.

6. A disc package as in claim 2, further comprising a closure flap sharing with said retention panel a different common side and having score lines which permit said closure flap to substantially contact said pocket panel after said sleeve contacts said folded sidewall sections, further comprising means for fastening said closure flap in contact with said pocket panel for keeping said sleeve in contact with said folded sidewall sections.

7. A disc package as in claim 1, wherein said tabs have an edge defining a curved contour having a radius of curvature, a remainder of said at least one of said folded sidewall section having a curved contour whose radius of curvature substantially conforms to that of the periphery of the disc and which is greater in magnitude than that of said radius of curvature of said tabs.

8. A disc package as in claim 1, further comprising:
   a cover panel sharing a common side with said retention panel for covering at least a portion of a disc retained therein, a spine being formed between said cover panel and said retention panel at said common side; and
   a closure flap sharing with said retention panel a different common side and having a further spine formed between said retention panel and said closure flap, said closure flap engaging said cover flap to close the disc package; and
   wherein said folded sidewall sections define respective spines extending out from said plane of said retention panel, whereby the resulting package has four spines at four respective sides of said disc package for strengthening said disc package and protecting a disc retained in said disc package.

9. A disc package, comprising:
   a retention panel defining a plane;
   folded sidewall sections extending out of said plane from said retention panel, said folded sidewall sections having edges facing each other and at least a portion of the facing edges being contoured to substantially correspond to a periphery of a disc for accommodating insertion of the disc between said facing edges; and
   tabs extending from at least a portion of at least one of said folded sidewall sections toward the other of said folded sidewall sections, and being spaced from said plane by a distance sufficient for accommodating a thickness of the disc between said plane and said tabs, said tabs extending over a surface portion of the inserted disc to retain the inserted disc;
   wherein said folded sidewall sections each comprise at least three folded panels separated one from the other by at least one respective fold line, said folded panels each being folded at said fold lines and arranged so that at least one of said folded panels is nested between two others of said folded panels, said folded sidewall sections each sharing with said retention panel a respective common side having a fold line in a folded condition.

10. A disc package as in claim 9, wherein said at least three folded panels comprises four folded panels.

11. A disc package as in claim 9, wherein said at least three folded panels comprises five folded panels.

12. A disc package, comprising:
a retention panel defining a plane;
first and second folded sidewall sections extending out of said plane from said retention panel, said first and second folded sidewall sections having edges facing each other and said facing edges being contoured to substantially correspond to a periphery of a disc for accommodating insertion of the disc between said facing edges; and
at least one tab extending from at least one of said first and second folded sidewall sections toward the other of said folded sidewall sections and being spaced from said plane by a distance sufficient for accommodating a thickness of the disc, the at least one tab contacting the disc at spaced apart peripheral portions to retain the disc therein;
wherein each of said folded sidewall sections includes at least first and second substantially adjacent panels, the first panel being interposed between the retention panel and the second panel, each of the first and second panels defining at least a portion of a facing edge, which portion has a radius of curvature which substantially conforms to a radius of curvature of the disc.

13. A disc package as in claim 12, further comprising a pocket panel sharing a common side with said retention panel, said pocket panel having a sleeve that defines a pocket into which promotional material may be removably contained, said common side having a score line for folding said sleeve about said score line and into contact with said folded sidewall sections.

14. A disc package as in claim 13, wherein said folded sidewall sections each have two ends, a first of said two ends being closer to said common side than that of a second of said two ends, said at least one tab extending from said first of said two ends of at least one of said folded sidewall sections.

15. A disc package as in claim 13, wherein said folded sidewall sections each have two ends, a first of said two ends being closer to said common side than that of a second of said two ends, said at least one tab extending from said second of said two ends of at least one of said folded sidewall sections.

16. A disc package as in claim 13, wherein said sidewall sections each have two ends, a first of said two ends being closer to said common side than that of a second of said two ends, said at least one tab extending from both of said ends of at least one of said folded sidewall sections.

17. A disc package as in claim 13, further comprising a closure flap sharing with said retention panel a different common side and having score lines which permit said closure flap to fold onto said pocket panel after said sleeve contacts said folded sidewall sections, and further comprising means for fastening said closure flap in contact with said pocket panel for keeping said sleeve in contact with said folded sidewall sections.

18. A disc package as in claim 12, wherein said at least one tab has an edge defining a curved contour having a radius of curvature, a remainder of said at least one of said first and second folded sidewall section having a curved contour whose radius of curvature substantially conforms to that of the periphery of the disc and which is greater in magnitude than that of said radius of curvature of said at least one tab.

19. A disc package as in claim 12, further comprising:
a cover panel sharing a common side with said retention panel for covering at least a portion of a disc retained therein, a spine being formed between said cover panel and said retention panel at said common side; and
a closure flap sharing with said retention panel a different common side and having a further spine formed between said retention panel and said closure flap, said closure flap engaging said cover flap to close the disc package; and
wherein said folded sidewall sections define respective spines extending out from said plane of said retention panel, whereby the resulting package has four spines at four respective sides of said disc package for strengthening said package and protecting a disc retained in said disc package.

20. A disc package, comprising:
a retention panel defining a plane;
folded sidewall sections extending out of said plane from said retention panel, said folded sidewall sections having edges facing each other and at least a portion of the facing edges being contoured to substantially correspond to a periphery of a disc for accommodating insertion of the disc between facing edges; and
at least one tab extending from at least one of said folded sidewall sections toward another of said folded sidewall sections and being spaced from said plane by a distance sufficient for accommodating a thickness of the disc;
wherein each of said folded sidewall sections comprises at least three folded panels separated one from the other by at least one respective fold line, said at last three folded panels each being folded at said fold lines and arranged so that at least one of said at least three folded panels is nested between two others of said folded panels, said folded sidewall sections each sharing with said retention panel a respective common side having a fold line in a folded condition.

21. A disc package as in claim 20, wherein said at least three folded panels comprises four folded panels.

22. A disc package as in claim 20, wherein said at least three folded panels comprises five folded panels.

23. A disc package for retaining a disc having a side peripheral edge, comprising:
a retention panel defining a plane; and
first and second folded sidewall sections extending out of said plane from said retention panel, said first and second folded sidewall sections having edges substantially facing each other and the facing edges being contoured to substantially correspond to the side peripheral edge of the disc for accommodating insertion of the disc between the facing edges and to frictionally retain the disc in the package;
wherein each of said first and second folded sidewall sections includes at least first and second substantially adjacent panels, the first panel being interposed between the retention panel and the second panel, each of the first and second panels defining at least a portion of a facing edge, which portion has a radius of curvature which substantially conforms to a radius of curvature of the side peripheral edge of the disc.

24. A disc package as in claim 23, further comprising a pocket panel sharing a common side with said retention panel, said pocket panel having a sleeve that defines a pocket into which material may be removably contained, said common side having a score line for folding said sleeve about said score line and into contact with said folded sidewall sections.

25. A disc package as in claim 23, wherein said folded sidewall sections each have first and second ends, the first end being closer to said common side than that of the second end.

26. A disc package as in claim 23, further comprising a closure flap sharing with said retention panel a different common side and having score lines which permit said closure flap to substantially contact said pocket panel after said sleeve contacts said folded sidewall sections, further comprising means for fastening said closure flap in contact with said pocket panel for keeping said sleeve in contact with said folded sidewall sections.

27. A disc package as in claim 23, further comprising:
a cover panel sharing a common side with said retention panel for covering at least a portion of a disc retained therein, a spine being formed between said cover panel and said retention panel at said common side; and
a closure flap sharing with said retention panel a different common side and having a further spine formed between said retention panel and said closure flap, said closure flap engaging said cover flap to close the disc package; and
wherein said folded sidewall sections define respective spines extending out from said plane of said retention panel, whereby the resulting package has four spines at four respective sides of said disc package for strengthening said disc package and protecting a disc retained in said disc package.

28. A disc package as in claim 23, further comprising:
at least one tab extending from at least a portion of each of said folded sidewall sections toward the other of said folded sidewall sections, and being spaced from said plane by a distance sufficient for accommodating a thickness of the disc, said at least one tab contacting the disc to frictionally retain the disc therein.

29. A disc package for retaining a disc having a side peripheral edge, comprising:
a retention panel defining a plane;
folded sidewall sections extending out of said plane from said retention panel, said folded sidewall sections having edges substantially facing each other, at least a portion of the facing edges being contoured to substantially correspond to and contact the side peripheral edge of the disc for accommodating insertion of the disc between said facing edges and to frictionally retain the disc in the package;
wherein each of said folded sidewall sections comprise at least three folded panels separated one from the other by at least one respective fold line, said folded panels each being folded at said fold lines and arranged so that at least one of said folded panels is nested between two others of said folded panels, said folded sidewall sections each sharing with said retention panel a respective common side having a fold line in a folded condition.

30. A disc package as in claim 24, wherein said at least three folded panels comprises four folded panels.

31. A disc package as in claim 24, wherein said at least three folded panels comprises five folded panels.

32. A disc package for retaining a disc having a side peripheral edge, comprising:
a retention panel defining a plane; and
first and second folded sidewall sections extending out of said plane from said retention panel, said first and second folded sidewall sections having edges substantially facing each other and the facing edges being contoured to substantially correspond to and contact the side peripheral edge of the disc for accommodating insertion of the disc between said facing edges and to frictionally retain the disc in the package;
wherein each of said first and second folded sidewall sections includes at least first and second substantially adjacent panels and a spine, the spine defining a distance between the first and second panels for retention of a disc therebetween, the first panel being interposed between the retention panel and the second panel, each of the first and second panels defining at least a portion of a facing edge, which portion has a radius of curvature which substantially conforms to a radius of curvature of the disc.

33. A disc package as in claim 32, wherein the spine is defined by at least two fold grooves.

34. A disc package, comprising:
a retention panel defining a plane; and
first and second folded sidewall sections extending out of said plane from said retention panel, said first and second folded sidewall sections having edges facing each other and the facing edges being contoured to substantially correspond to a periphery of a disc for accommodating insertion of the disc between the facing edges;
wherein each of said first and second folded sidewall sections includes at least first and second substantially adjacent panels, the first panel being interposed between the retention panel and the second panel, each of the first and second panels defining at least a portion of a facing edge, which portion has a radius of curvature which substantially conforms to a radius of curvature of the disc.

35. A holder comprising:
a retention panel defining a plane;
first and second folded sidewall sections extending out of said plane from said retention panel, said first and second folded sidewall sections having edges facing each other and the facing edges being contoured to substantially correspond to a periphery of an object for accommodating insertion of the object between the facing edges; and
tabs extending from at least a portion of at least one of said first and second folded sidewall sections toward the other of said first and second folded sidewall sections, and being spaced from said plane by a distance sufficient for accommodating a thickness of the object between said plane and said tabs, said tabs extending over a surface portion of the inserted object to contact the object at spaced apart peripheral portions to retain the object therein;
wherein each of said first and second folded sidewall sections includes at least first and second substantially adjacent panels, the first panel being interposed between the retention panel and the second panel, each of the first and second panels defining at least a portion of a facing edge which substantially conforms to the periphery of the object.

36. A holder comprising:
a retention panel defining a plane; and
first and second folded sidewall sections extending out of said plane from said retention panel, said first and second folded sidewall sections having edges facing each other and the facing edges being contoured to substantially correspond to a periphery of an object for accommodating insertion of the object between the facing edges;
wherein each of said first and second folded sidewall sections includes at least first and second substantially adjacent panels, the first panel being interposed between the retention panel and the second panel, each of the first and second panels defining at least a portion of a facing edge which substantially conforms to the periphery of the object.

37. A holder comprising:

a retention panel defining a plane;

first and second folded sidewall sections extending out of said plane from said retention panel, said first and second folded sidewall sections having edges facing each other and the facing edges being contoured to substantially correspond to a periphery of an object for accommodating insertion of the object between the facing edges; and at least one tab extending from at least one of said first and second sidewall sections toward the other of said folded sidewall sections and being spaced from said plane by a distance sufficient for accommodating a thickness of the object, said at least one tab contacting the disc at spaced apart peripheral portions to retain the object therein;

wherein each of said first and second folded sidewall sections includes at least first and second substantially adjacent panels, the first panel being interposed between the retention panel and the second panel, each of the first and second panels defining at least a portion of a facing edge which substantially conforms to the periphery of the object.

38. A holder for retaining an object having a side peripheral edge, comprising:

a retention panel defining a plane; and first and second folded sidewall sections extending out of said plane from said retention panel, said first and second folded sidewall sections having edges substantially facing each other and the facing edges being contoured to substantially correspond to and contact the side peripheral edge of the object for accommodating insertion of the object between said facing edges and to frictionally retain the object in the package;

wherein each of said first and second folded sidewall sections includes at least first and second substantially adjacent panels, the first panel being interposed between the retention panel and the second panel, each of the first and second panels defining at least a portion of a facing edge which substantially conforms to the side peripheral edge of the object.

39. A holder for retaining an object having a side peripheral edge, comprising:

a retention panel defining a plane; and first and second folded sidewall sections extending out of said plane from said retention panel, said first and second folded sidewall sections having edges substantially facing each other and the facing edges being contoured to substantially correspond to and contact the side peripheral edge of the object for accommodating insertion of the object and to frictionally retain the object in the package;

wherein each of said first and second folded sidewall sections includes at least first and second substantially adjacent panels and a spine, the spine defining a distance between the first and second panels for retention of the object therebetween, the first panel being interposed between the retention panel and the second panel, each of the first and second panels defining at least a portion of a facing edge which substantially conforms to the side peripheral edge of the object.

40. A holder comprising:

a retention panel defining a plane; and first and second folded sidewall sections extending out of said plane from said retention panel, said first and second folded sidewall sections having edges facing each other and the facing edges being contoured to substantially correspond to a periphery of an object for accommodating insertion of the object between the facing edges;

wherein each of said folded sidewall sections includes at least first and second substantially adjacent panels, the first panel being interposed between the retention panel and the second panel, each of the first and second panels defining at least a portion of a facing edge which substantially conforms to the periphery of the object.

* * * * *

UNITED STATES PATENT AND TRADEMARK OFFICE
CERTIFICATE OF CORRECTION

PATENT NO. : 5,749,463
DATED : May 12, 1998
INVENTOR(S) : COLLINS, William

It is certified that error appears in the above-identified patent and that said Letters Patent is hereby corrected as shown below:

Column 13, line 51 (claim 30, line 1),

"in claim 24" should be --in claim 29--.

line 53 (claim 31, line 1),

"in claim 24" should be --in claim 29--.

Signed and Sealed this

Twenty-fifth Day of May, 1999

Attest:

Q. TODD DICKINSON

*Attesting Officer*   Acting Commissioner of Patents and Trademarks